United States Patent [19]
Yamamoto

[11] Patent Number: 5,808,675
[45] Date of Patent: Sep. 15, 1998

[54] IMAGE RECORDING APPARATUS

[75] Inventor: Yasuhiro Yamamoto, Tokyo, Japan

[73] Assignee: Asahi Kogaku Kogyo Kabushiki Kaisha, Tokyo, Japan

[21] Appl. No.: 550,770

[22] Filed: Oct. 31, 1995

[30] Foreign Application Priority Data

Nov. 1, 1994  [JP]  Japan .................................. 6-292327

[51] Int. Cl.⁶ ....................................................... H04N 1/04
[52] U.S. Cl. ........................... 348/294; 358/474; 382/318
[58] Field of Search ..................... 358/444, 474, 358/494, 497, 500, 504, 524; 382/318; 348/294, 103, 106, 421, 422

[56] References Cited

FOREIGN PATENT DOCUMENTS 0585853  3/1994  European Pat. Off. ......... H04N 1/21
690423  3/1994  Japan ............................. H04N 5/781

*Primary Examiner*—Andrew Faile
*Assistant Examiner*—Andrew B. Christensen
*Attorney, Agent, or Firm*—Greenblum & Bernstein, P.L.C.

[57] ABSTRACT

An image recording apparatus having a device for scanning a line of an image along a first scanning direction. One of a plurality of formats for storing an image is selected. In accordance with the selected format, one of a plurality of second scanning directions for moving the scanning device is selected. The second scanning directions are perpendicular to the first scanning direction. The scanning device is then moved along the determined second scanning direction after scanning a line of an image along the first scanning direction.

20 Claims, 3 Drawing Sheets

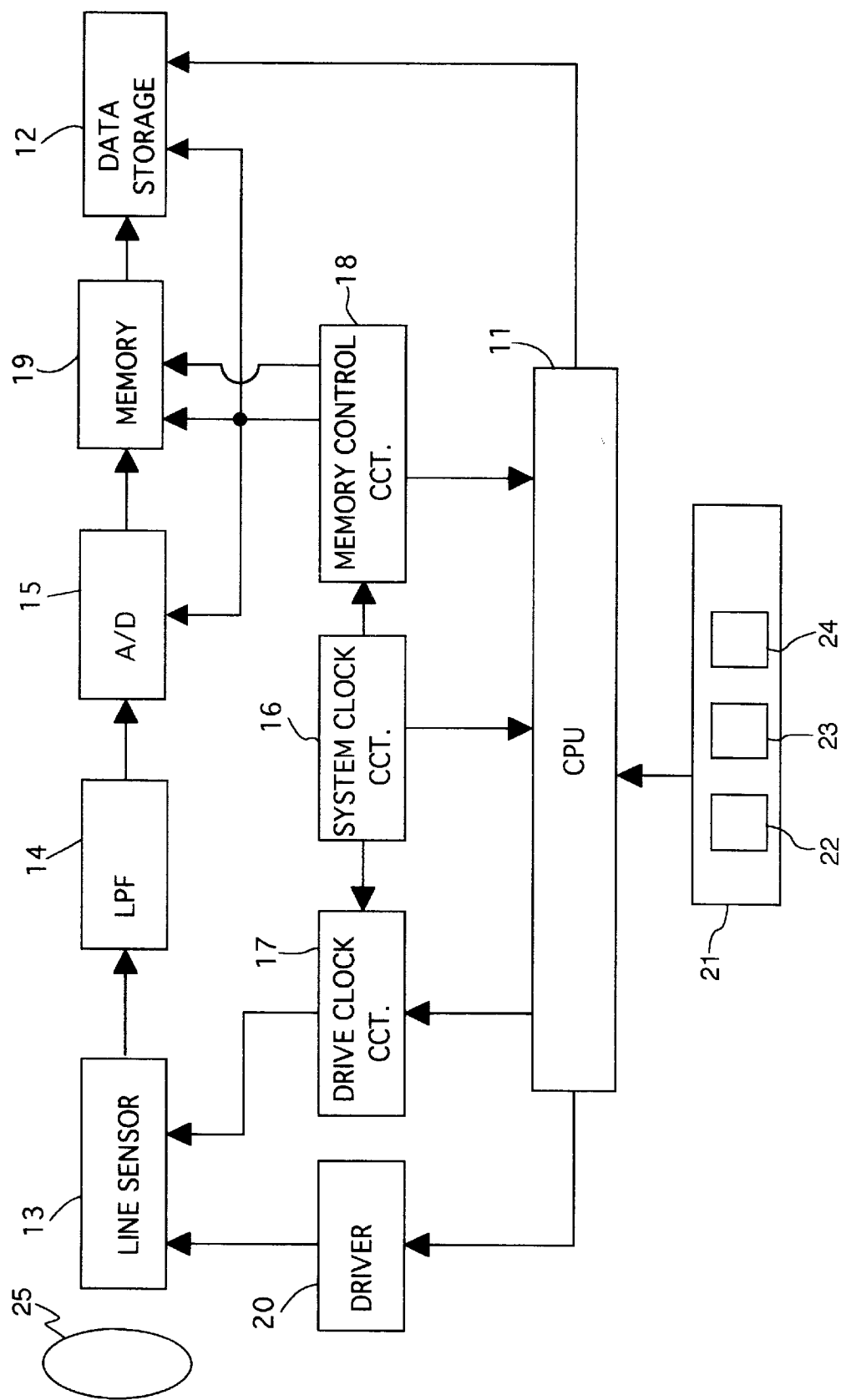

IMAGE RECORDING APPARATUS

BACKGROUND OF THE INVENTION

The present invention relates to an image recording apparatus for scanning an image and for storing image data in a storage device, in accordance with a predetermined format.

In a conventional image recording apparatus such as an electronic camera or an image scanner, an image is scanned line by line using a line sensor. The line image data is then stored in a frame memory as a bit map. When an entire frame has been stored, the image data is converted into a desired bit-mapped format such as TIFF or BMP, and then stored in a storage device such as a floppy disk or a hard disk.

However, since an entire frame of the image is stored, the size of the memory required is large, and therefore, expensive.

SUMMARY OF THE INVENTION

It is therefore an object of the present invention to provide an image recording apparatus, such as an electronic camera or an image scanner, which can store an image in one of a plurality of formats, while minimizing a size of the memory required for the image recording apparatus.

According to an aspect of the present invention, there is provided an image recording apparatus which includes a device for selecting one of a plurality of formats for storing an image, a line sensor for scanning a line of the image along a first scanning direction, and a device for moving the line sensor along one of a plurality of second scanning direction, with the second scanning directions being perpendicular to the first scanning direction. The second scanning direction is determined in response to the format selected for storing the scanned image.

The formats for storing the scanned image data include the TIFF format and the BMP format.

Further, an initial position of the line sensor is also determined in response to the format selected for storing the scanned image. If the TIFF format is selected, then the moving device positions the line sensor at the top of the image, and the second scanning direction is from the top of the image to the bottom of the image. However, if the BMP format is selected, then the moving device positions the line sensor at the bottom of the image, and the second scanning direction is from the bottom of the image to the top of the image.

In a preferred embodiment of the present invention, the image recording apparatus is an electronic camera.

According to another aspect of the present invention, there is provided a method of scanning an image using a line sensor of an image recording apparatus, the line sensor extending along a first scanning direction. The method includes the steps of selecting one of a plurality of formats for storing the scanned image; determining which one of a plurality of second scanning directions the line image scanner is to be moved in response to the selected format for storing the scanned image, each of the plurality of second scanning directions being perpendicular to the first scanning direction; positioning the line sensor at one a first and a second position in response to the selected format for storing the scanned image; scanning a line of the image along the first scanning direction; and moving the line sensor along the determined second scanned direction.

According to a third aspect of the present invention, there is provided an image recording apparatus which includes a device for selecting one of at least a first format and a second format for storing a photographed image, a line sensor for scanning a line of an image along a first scanning direction, and a device for driving the line sensor along a second scanning direction between a first position and a second position, the second scanning direction being perpendicular to the first scanning direction. An initial position of the line sensor and a direction in which the line sensor is driven, is determined in accordance with the selected format.

According to a fourth aspect of the present invention, there is provided an image recording apparatus for recording an image. The image recording apparatus includes a line sensor having a plurality of linearly arranged image receiving elements which extend in a first direction, a memory for temporarily storing image data output by the line sensor, and a controller for transmitting the image data stored in the memory to a recording medium. The image recording apparatus determines one of a plurality of formats for storing the image in the recording medium. An initial position from which the line sensor starts receiving the line of the image is determined and the line sensor is moved by a moving device in one of a plurality of second directions, after reception of each of the line of the image. The second direction, which is perpendicular to the first direction, is selected in response to the storage format of the image.

Therefore, only a small-sized memory capable of storing one line of data is required in the image recording apparatus in order to process the image data. This reduces the size and cost of the image recording apparatus.

BRIEF DESCRIPTION OF THE DRAWINGS

FIG. 1 shows a block diagram of an image recording apparatus embodying the present invention;

DESCRIPTION OF THE EMBODIMENTS

Figure 2A:
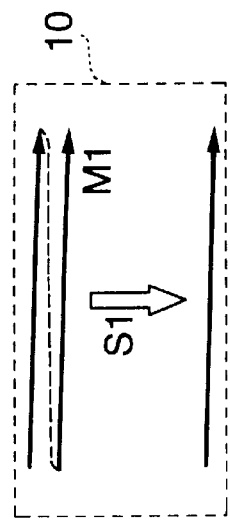
FIGS. 2A and 2B show schematic diagrams of the scanning of an image by an image sensor when a first storage format of the image is selected, according to the present invention.

FIG. 1 shows a block diagram of an electronic camera as a preferred embodiment of an image recording apparatus embodying the present invention. The electronic camera is controlled by a CPU 11. An operation panel 21 has a format setting button 22, a power switch 23, a shutter release switch 24, and other operation keys (not shown). The format setting button 22 is used to select between two bit-mapped formats (i.e., TIFF or BMP) for storing the image data.

An image of an object to be photographed is formed by a photographic optical system 25, in a frame area 10 (see FIGS. 2A through 3B), scanned by a line sensor 13. The direction in which the line sensor 13 extends is a main scanning direction. The length of the line sensor 13 is equivalent to one line of the image. The line sensor 13 is moved by a driver 20, in an auxiliary scanning direction, which is perpendicular to the main scanning direction. Image data is generated by moving the line sensor 13 in the auxiliary scanning direction.

The driver 20 is controlled by the CPU 11, and positions the line sensor 13 at an initial position. The initial position is determined in accordance with the type of bit-mapped format selected by the format setting button 22.

The line sensor 13 outputs an electric signal which is filtered by a low-pass filter 14. The filtered electric signal is then digitized by the A/D converter 15, and the resulting digital signal is stored in a memory 19. A memory control circuit 18 controls the address of the memory 19 to which the image data is written, in accordance with a clock signal generated by a system clock circuit 16. Further, the line sensor 13 is driven in accordance with a clock signal generated by a drive clock circuit 17.

The digital signal stored in the memory 19 is transferred to a data storage device 12. The data storage device 12 is a removable hard disk. However, a built-in hard disk, or flash memory may also be employed. If a built-in hard disk is employed, then the electronic camera should have an interface for allowing data to be transferred to an external device, such as a converter.

As mentioned above, the electronic camera can output bit-mapped images in the TIFF or BMP formats. In order to produce a TIFF formatted bit-mapped image, the image of the object is scanned from left to right and top to bottom. However, for a BMP bit-mapped image, the image of the object is scanned from left to right and bottom to top.

Figure 3A:
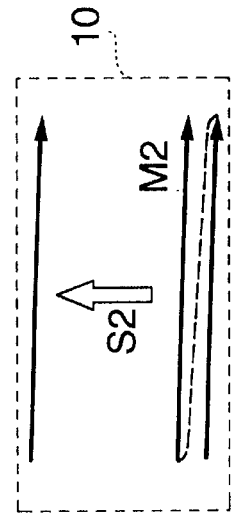
FIGS. 3A and 3B show schematic diagrams of the scanning of an image by an image sensor when a second storage format of the image is selected, according to the present invention.

FIGS. 2A and 3A show schematic diagrams of the line sensor 13 relative to the frame area 10 of the image of the object to be photographed, which is to be scanned according to the TIFF and BMP bit-mapped image formats, respectively. The line sensor 13 is moved from a position 13b (i.e., at the top of the frame area 10) to a position 13a (i.e., at the bottom of the frame area 10), in order to produce the TIFF image. Conversely, the line sensor 13 is moved from a position 13a (i.e., at the bottom of the frame area 10) to a position 13b (i.e., at the top of the frame area 10), in order to produce the BMP image.

Figure 2B:
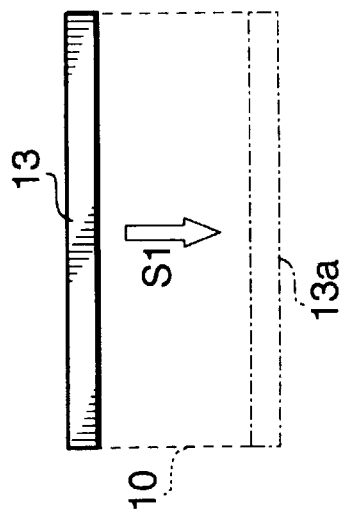

In FIG. 2A, the line sensor 13 is initially positioned at the top of the frame area 10. A switch (not shown) is provided for detecting when the line sensor 13 is located at top of the frame area 10. When the line sensor 13 has reached the top of the frame area the switch is turned ON. After a line has been scanned from Left to right along a main scanning direction M1, the line sensor 13 is moved down one line in an auxiliary scanning direction S1, until all the lines have bean scanned. The line sensor 13 will then be at the position 13a, as shown in FIG. 2A. FIG. 2B shows the scanning direction of the line sensor 13 when the image is being scanned to produce a TIFF bit-mapped image.

Figure 3B:
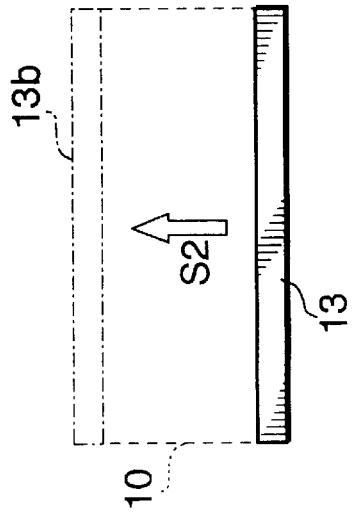

In FIG. 3A, the line sensor 13 is initially positioned at the bottom of the frame area 10. Another switch (not shown) is provided for detecting when the line sensor 13 is located at bottom of the frame area 10. When the line sensor 13 has reached the bottom of the frame area, this switch is turned ON. After a line has been scanned from left to right along the main scanning direction M1, the line sensor 13 is moved up one line in an auxiliary scanning direction S2, until all the lines have been scanned. The line sensor 13 will then be at the position 13b, as shown in Fig 3A. FIG. 3B shows the scanning direction of the line sensor 13 when the image is being scanned to produce a BMP bit-mapped image.

Figure 4:
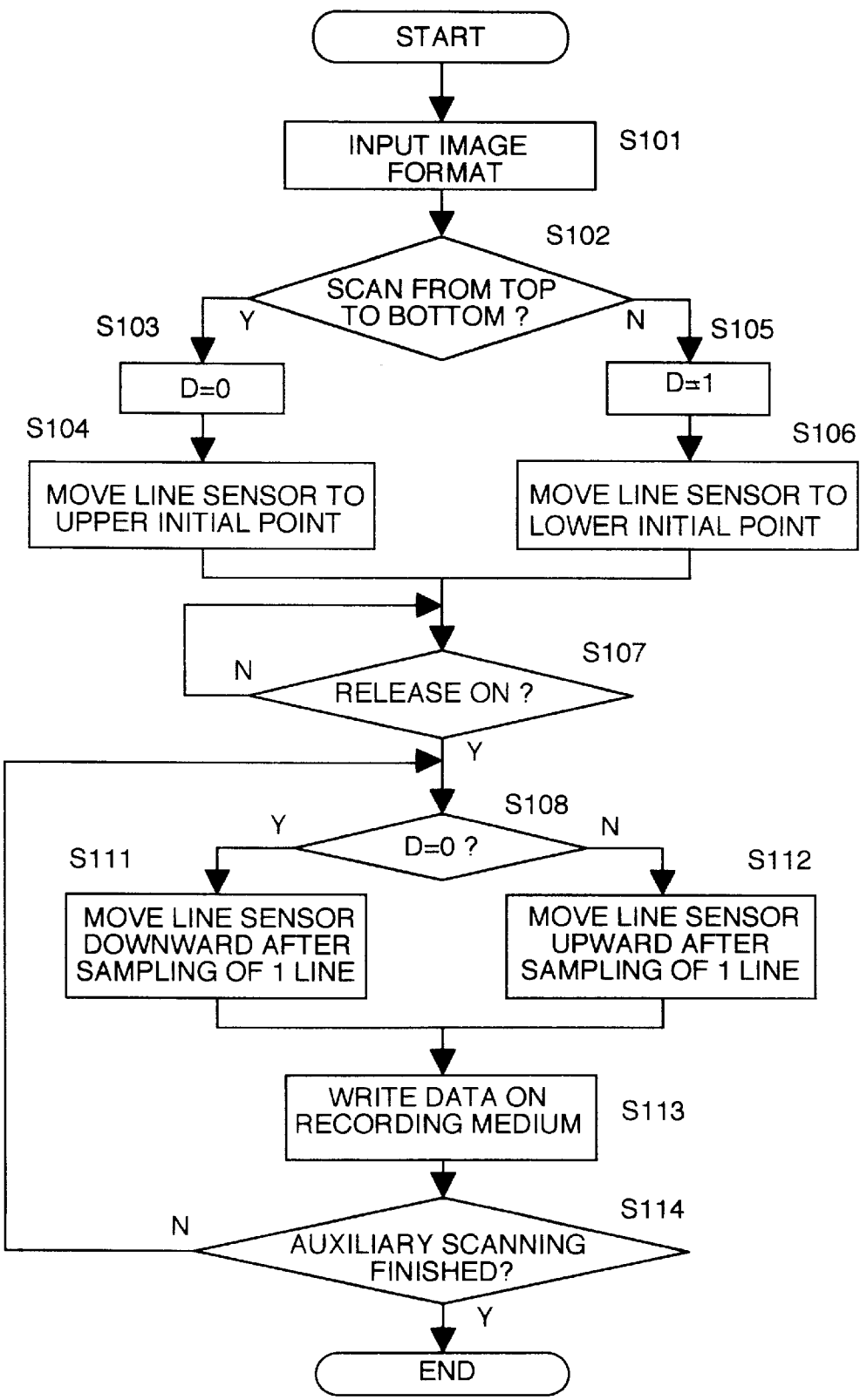
FIG. 4 shows a flowchart of an operation of the electronic camera according to the present invention.

FIG. 4 shows a flow chart of an operation of the scanning of an image using the image sensor 13. Initially, in step S101, the image format is input using the format setting switch 22. Step S102 determines whether the auxiliary scanning direction is top to bottom (i.e., a TIFF bit-mapped image was selected in step S101) or from bottom to top (i.e., a BMP bit-mapped image was selected in step S101).

If a TIFF bit-mapped image was selected (S102:Y) then a flag D is set equal to 0 in step S103. In step S104, the line sensor 13 is moved to an upper initial point by the driver 20. If a BMP bit-mapped image was selected (S102:N), then a flag D is set equal to 1 in step S105. In step S106, the line sensor 13 is moved to a lower initial point by the driver 20.

Step S107 determines whether the shutter release switch 24 has been depressed. If the shutter release switch 24 has been depressed (S107:Y), then step S108 determines whether the flag D is equal to 0 or 1. If D is equal to 0 (S108:Y), the line sensor 13 scans the first line of the image and then is moved down one line by the driver 20, in step S111. If D is equal to 1 (S108:N), the line sensor 13 scans the first line of the image and is then moved up one line by the driver 20, in step S112.

In step S113, the digitized image data for the scanned line is written to the data storage device 12. Then, step S114 determines whether the scanning of all of the lines of the image, in the auxiliary direction is completed. If the TIFF image data is being produced, then step S114 determines whether the line sensor 13 has reached position 13a at the bottom of the frame area 10. Conversely, if the BMP image data is being produced, then step S114 determines whether the line sensor 13 has reached position 13b at the top of the frame area 10. However, since the number of lines of the image that will be in the frame area 10 is known, then step S114 can determine when the scanning of all of the lines is completed by counting the number of lines that have been scanned in the auxiliary direction, and comparing the counted number to a known reference number.

If the scanning of all of the lines in the auxiliary direction is not completed (S114:N), then control proceeds to step S108, and the steps S108 through S114 are repeated. Otherwise (S114:Y), the routine is ended.

As described above, the setting of the storage format of the image, is set by the operator and the scanning of the image by the line sensor 13 is set in accordance with the selected image format. Further, by utilizing a line sensor, only a single line memory, which is much smaller than a frame memory, needs to be employed. Therefore, the size and cost of manufacturing the image recording apparatus can be reduced. Furthermore, if a color image is being scanned, red, green and blue filters and three line sensors are necessary. However, in this case the memory required to store the three lines of image data is also substantially smaller than the frame memory.

In the preferred embodiment described above, the setting of the format setting switch 22 is read by the CPU when the power is turned ON. However, in a modification of this embodiment, the CPU can read the setting of the format switch 22 at any time before the shutter release switch 23 is depressed. In this case, in the flowchart shown in FIG. 4, when the step S107 determines that the release button is not depressed, the control will return to step S101.

Furthermore, in the embodiment described above two image storage formats TIFF and BMP are described. However, the invention may be applied to a camera which uses any two storage formats in which the scanning directions are different.

The present disclosure relates to subject matter contained in Japanese Patent Application No. HEI 6-292,327 filed on Nov. 1, 1994, which is expressly incorporated herein by reference in its entirety.

What is claimed is:

1. An image recording apparatus comprising:

means for selecting one of a plurality of formats for storing an image;

means for scanning a line of said image along a first scanning direction;

means for moving said scanning means along one of a plurality of second scanning directions; and means for determining which of said plurality of second scanning directions said moving means moves said scanning means, in response to said selected format for storing said scanned image, each of said plurality of second scanning directions being perpendicular to said first scanning direction.

2. The image recording apparatus according to claim 1, wherein said plurality of formats for storing said scanned image include at least a TIFF format and a BMP format.

3. The image recording apparatus according to claim 2, wherein when said format selecting means selects said TIFF format, said moving means moves said scanning means from a top of said image to a bottom of said image.

4. The image recording apparatus according to claim 2, wherein when said format selecting means selects said BMP format, said moving means moves said scanning means from a bottom of said image to a top of said image.

5. The image recording apparatus according to claim 1, further comprising means for determining an initial position of said moving means in response to said selected format for storing said scanned image.

6. The image recording apparatus according to claim 5, wherein said plurality of formats for storing said scanned image include at least a TIFF format and a BMP format, wherein when said TIFF format is selected, said initial position is at a top of said image, and wherein when said BMP format is selected, said initial position is at a bottom of said image.

7. The image recording apparatus according to claim 1, further comprising an electronic camera.

8. A method of scanning an image using a line sensor of an image recording apparatus, said line sensor extending along a first scanning direction, the method comprising the steps of:

selecting one of a plurality of formats for storing said scanned image;

determining in which one of a plurality of second scanning directions said line image scanner is to be moved, in response to the selection of a format for storing said scanned image, each of said plurality of second scanning directions being perpendicular to said first scanning direction;

positioning said line sensor at one of a first position and a second position in response to the selection of a format for storing said scanned image;

scanning a line of said image along said first scanning direction; and moving said line sensor along said determined second scanning direction.

9. The method according to claim 8, wherein said plurality of formats for storing said scanned image include at least a TIFF format and a BMP format.

10. The image recording apparatus according to claim 9, wherein when said formatting step selects said TIFF format, said line image scanner is moved from said first position to said second position.

11. The image recording apparatus according to claim 9, wherein when said formatting step selects said BMP format, said line image scanner is moved from said second position to said first position.

12. An image recording apparatus, comprising:

means for selecting one of at least a first and a second format for storing a photographed image;

a line sensor for scanning a line of an image along a first scanning direction;

means for driving said line sensor along one of a plurality of second scanning directions between a first position and a second position, each of said plurality of second scanning directions being perpendicular to said first scanning direction; and means for determining an initial position of said line sensor and a direction in which said line sensor is driven in accordance with said selected format.

13. The image recording apparatus according to claim 12, wherein when said determining means determines that said initial position is said first position, said driving means drives said line sensor from said first position to said second position, in response to said first format being selected by said selecting means, and when said determining means determines that said initial position is said second position, and said driving means drives said line sensor from said second position to said first position, in response to said second format being selected by said selecting means.

14. An image recording apparatus for recording an image, comprising:

a line sensor having a plurality of linearly arranged image receiving elements, said image receiving elements extending in a first direction;

a memory for temporarily storing image data output by said line sensor;

a controller for transmitting said image data stored in said memory to a recording medium;

means for determining one of a plurality of formats for storing said image;

means for determining an initial position from which said line sensor starts receiving said line of said image;

means for selecting one of a plurality of second directions for moving said line sensor, in response to said determined format for storing said image, each of said plurality of second directions being perpendicular to said first direction; and means for moving said line sensor in said selected second direction after reception of each of said lines of said image.

15. The image recording apparatus according to claim 14, wherein said plurality of formats for storing said scanned image include at least a TIFF format and a BMP format.

16. The image recording apparatus according to claim 15, wherein when said format determining means selects said TIFF format, said moving means moves said scanning means from a top of said image to a bottom of said image.

17. The image recording apparatus according to claim 15, wherein when said format determining means selects said BMP format, said moving means moves said scanning means from a bottom of said image to a top of said image.

18. An image recording apparatus for recording data of an image, comprising:

means for receiving a line of said image, said receiving means extending in a first direction and outputting image data corresponding to said line of said image;

means for temporarily storing said image data output by said receiving means;

means for transmitting said image data stored in said storing means to a recording medium;

means for determining one of a plurality of formats for storing said image;

means for determining an initial position from which said receiving means starts receiving said line of said image; and means for moving said receiving means in one of a plurality of second directions after reception of each of said lines of said image, said plurality of second directions being perpendicular to said first direction, wherein said one of said plurality of second directions is selected in response to said determined format for storing said image.

19. The image recording apparatus according to claim 18, wherein said storing means stores a single line of image data.

20. The image recording apparatus according to claim 18, wherein said image recording apparatus further comprises an electronic camera.

* * * * *